May 11, 1926.
S. K. DAVIS ET AL
1,584,513
RAPID AND CHANGEABLE DRILL FOR MATHEMATICS, PHONICS, AND SILENT READING
Filed Jan. 12, 1925      3 Sheets-Sheet 1
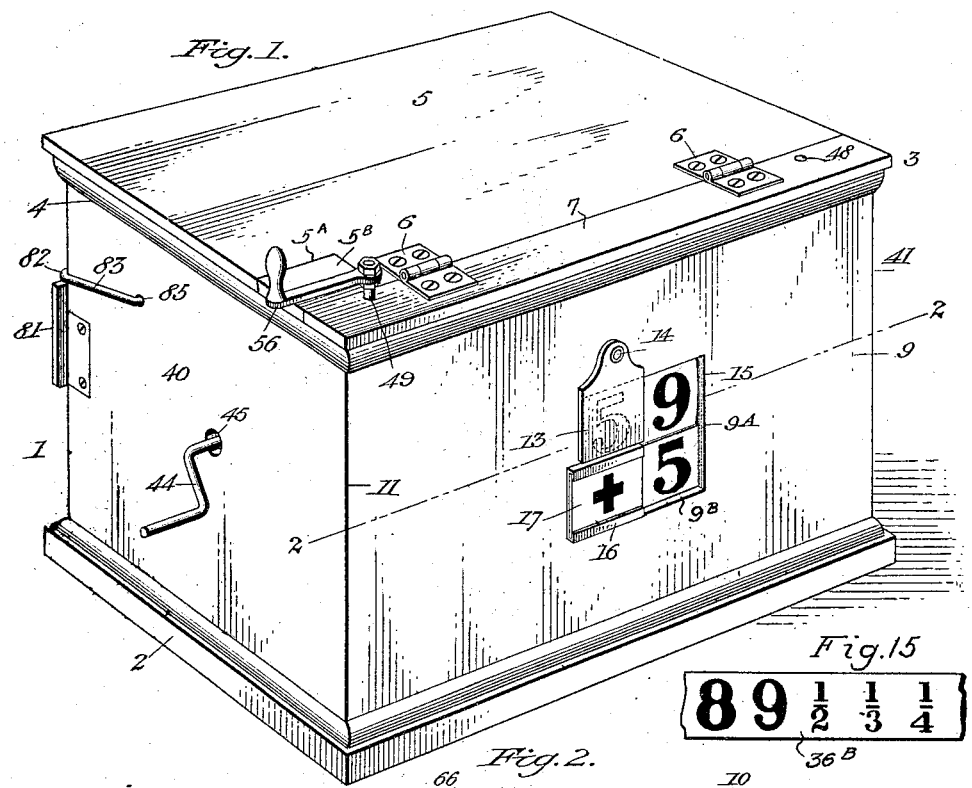
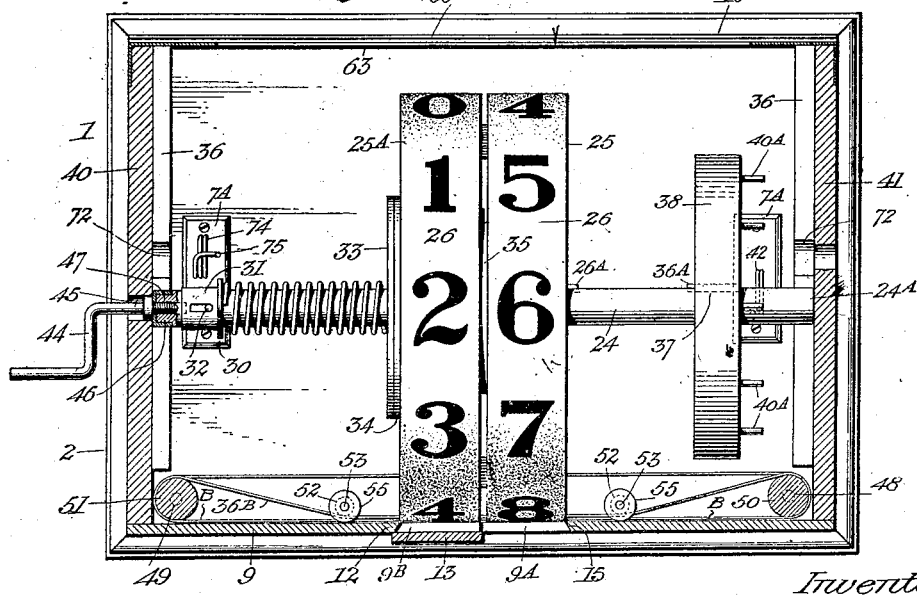
Inventor:
Stewart K. Davis
Anna B. Davis
By H. S. Bailey, Attorney.

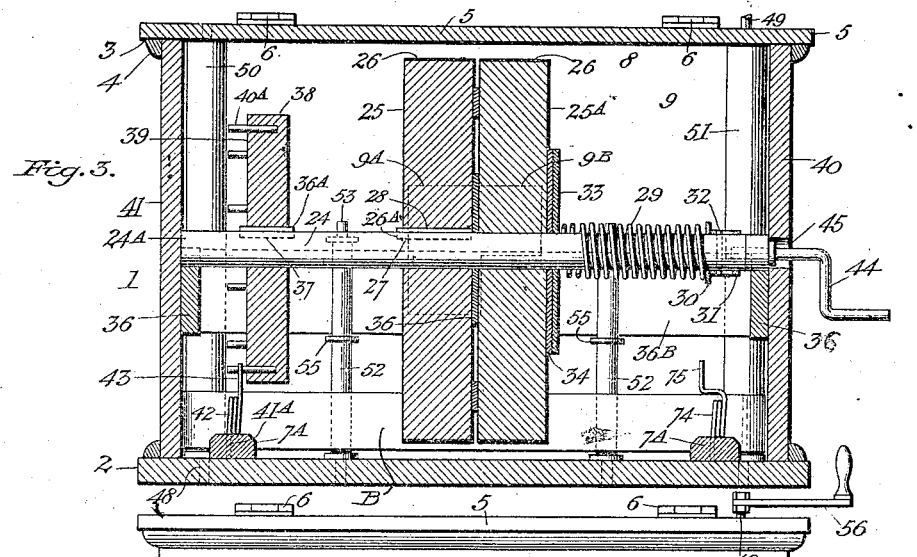

May 11, 1926.
S. K. DAVIS ET AL
1,584,513
RAPID AND CHANGEABLE DRILL FOR MATHEMATICS, PHONICS, AND SILENT READING
Filed Jan. 12, 1925     3 Sheets-Sheet 3
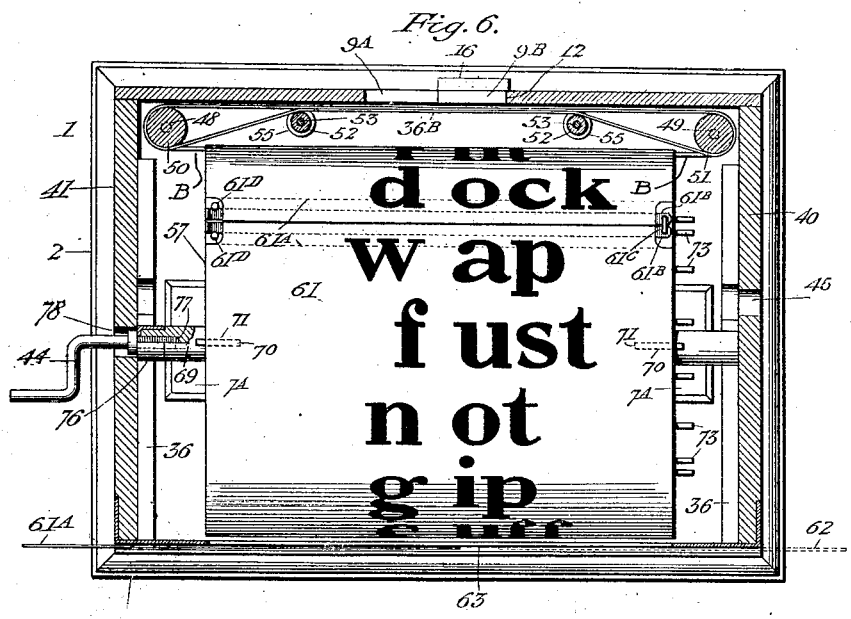
 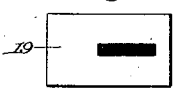 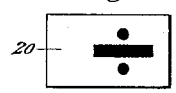
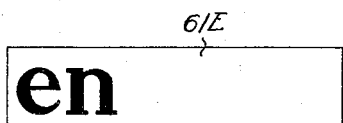
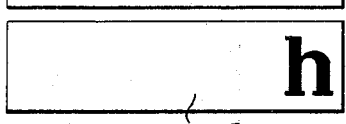
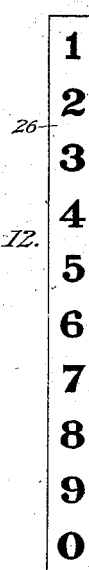
Inventor:
Stewart K. Davis
Anna B. Davis
By H. S. Bailey, Attorney Patented May 11, 1926.

1,584,513

UNITED STATES PATENT OFFICE.

STEWART K. DAVIS AND ANNA B. DAVIS, OF DENVER, COLORADO.

RAPID AND CHANGEABLE DRILL FOR MATHEMATICS, PHONICS, AND SILENT READING.

Application filed January 12, 1925. Serial No. 1,914.

Our invention relates to a new rapid and changeable drill for mathematics, phonics and silent reading.

And the objects of our invention are:

First: To provide a speedy way for drill in the four fundamentals in arithmetic.

Second: To provide a quick recognition of words which will tend toward rapid reading, which calls for thought before the action expressed by the words.

Third: To provide an educational system by means of which junior students are given quick visible and mental lessons in addition, subtraction, multiplication, division, in word formation and sentence comprehending examples.

Fourth: To provide an educational system by means of which various examples in arithmetic and word and sentence understanding are so displayed that they can be comprehended instantly by a quick look of the eye and a mental perception of the meaning of the example displayed.

We attain these objects by the mechanism illustrated in the accompanying drawings, in which:

Figure 1 is a perspective view of our educational device showing one side of our cabinet and illustrating the exhibition of an example in arithmetic.

Figure 2 is a horizontal sectional view on the line 2—2 of Figure 1, showing the cabinet provided with rotatable disks adapted for arithmetical drill.

Figure 3 is a central vertical longitudinal sectional view of the cabinet arranged the same as in Figures 1 and 2.

Figure 4 is a side view of the opposite side of the cabinet to that shown in Figure 1, and showing the manner of supplying either prefixes or suffixes of one or more letters to a given word, to form a different word.

Figure 5 is a transverse vertical sectional view, the cabinet being arranged as shown in Figure 2.

Figure 6 is a horizontal sectional view like Figure 2, but showing the cabinet provided with a rotatable cylinder having words thereon for drill work in connection with the affixes and suffixes of one or more letters.

Figures 7, 8 and 9, are views, respectively, of the multiplication, minus, and division symbols, which in practice are printed on cardboard strips, for use in connection with arithmetical drill work.

Figure 10 is a view of one of the suffix cards.

Figure 11 is a view of one of the affix cards.

Figure 12 is a view of one of the strips having the numerals from 1 to 0 printed thereon, which are used in connection with the disks shown in Figures 2, 3 and 5.

Figure 13 is a view of a portion of a strip to be placed around the cylinder shown in Figure 6, and used in place of the strip shown thereon, for drill work in reading, and Figure 14 is a diagrammatic view showing the manner of securing the fabric band having words or sentences thereon, to the cylinder.

Fig. 15 is a view of a portion of the endless ribbon having numerals and fractions thereon.

Similar letters of reference refer to similar parts throughout the several views.

Referring to the drawings:

The numeral 1 designates a square box which is preferably about fourteen inches long by ten inches high and nine inches wide, but it may be made larger if desired.

We preferably make this cabinet of wood, but it can be made of aluminum or any other suitable material.

Our cabinet is provided with a projecting base 2, and it is also provided with a projecting top edge 3, that is provided with a moulding 4.

A cover 5, is secured by hinges 6, to a narrower strip of wood 7, that is secured to the top 8, of the cabinet along its side 9; the strip 7, and the cover 5, project over the top edges of the cabinet all around it.

The two opposite sides 9 and 10, are used at different times to exhibit different characters of instructive numerals, words and combinations of words in different combinations of numerals and words, and on the side 9, we form a right angled aperture $9^A$, through the side 9, of the cabinet with the horizontal part $9^B$, of the aperture extending towards the left hand side edge 11 of the cabinet, but over the upper left hand half, of this right angled aperture $9^A$, a pivotally swinging slide 13, which hangs straight down from a pivotal screw 14, over the half part 12, and closes it when it is desired to use only the vertical part 15 of the aperture $9^A$, and whenever it is desired to use the whole of the aperture 9ᴬ, to expose instructive elements, the slide 13, is swung around towards the left hand corner 11, of the cabinet and up high enough to uncover the full size of the right angled aperture 9ᴬ.

Directly below the swinging slide 13, a card holding plate 16, is secured in which cards having different signs or indicating characters are printed such as the plus sign 17, on one card, the multiplication sign 18, on another card, and the minus sign 19, and the division sign 20, on another card. These different sign cards 17, 18, 19 and 20, are used one at a time to indicate the character of the mathematical example before the student or the class of students, and they are adapted to be quickly and easily attached to and removed from the plate.

Our invention contemplates any means for quickly securing and removing these cards to the plate 16. We preferably, however, use a slideway 21, into which the cards are pushed horizontally from the left hand side of the cabinet; and we make this slideway 21, by bending over the upper and the lower edges 22 and 23 of the plate towards the center of the plate far enough and at a space from the surface of the plate to overlap the opposite side edges of each card and also form a slideway space between the overturned edges and the surface of the plate for the cards to slide loosely in.

Within the cabinet 1, facing this right angled aperture 9ᴬ, we rotatably mount on the shaft 24, two discs 25 and 25ᴬ, which are placed side by side on the shaft 24, but preferably with a narrow space between them.

Each one of these discs is preferably about an inch and a half wide by about eight inches in diameter, and each is provided with a ribbon 26, which may be permanently or removably secured to it as desired, on which the numerals from 1 to 9 and the 0, or zero, are printed in figures preferably about one and three eighths of an inch long and in proportional widths, and the numerals on each disc are placed opposite each other so that any two numerals are displayed on the two discs, side by side, in the upper part of the aperture 9ᴬ, and the numerals are printed on the two discs in successive order from 1 to 9, and 0, or zero, as shown on a straightened out ribbon in Figure 11.

The disc 25, is secured to the shaft 24, by any suitable means, but preferably by a key 26ᴬ, and by a keyway 27, in the shaft, and a keyway 28, in the disc 25. The disc 25ᴬ, is mounted loosely on the shaft 24, and it is held with a frictional pressure against the disc 25, by a coiled expansive pressure spring 29, that is placed over the shaft and its outer end bears against a washer 30, that is placed against a collar 31, which is secured to the shaft by any suitable means preferably by a pin 32, which is extended through it and the shaft, and the opposite end of the spring bears expansively against a large washer 33, behind which a rubber washer 34, is placed which bears against the adjacent side of the disc, and the expansive pressure of the spring holds the large hub member 35, of this disc with frictional pressure enough against the adjacent side of the disc 25ᴬ, to cause the rotative movement of the shaft and of the disc 25, that is keyed to it to rotate the disc 25ᴬ, with it, but at the same time the teacher can, by taking hold of these two discs, one with one hand and the other with the other hand, turn the disc 25ᴬ independently of the disc 25, and thus bring any of the numerals of the disc 25ᴬ opposite to any numeral on the disc 25, and consequently when this is done the numerals on the disc 25ᴬ, are of different denominations, and they can be placed so that numerals of the same denomination will come opposite to each other; thus the two threes or the two sixes, or any other pair of the numerals from 1 to 9 may be in pairs opposite to each other.

The shaft 24 is rotatably journaled in bearings that are arranged in a separate piece of wood or metal 36, that is placed and secured against the inside surfaces of the opposite ends 40 and 41 of the cabinet in order to allow the shaft to be lifted up out of them with the discs, and consequently out of the cabinet.

On the shaft 24, within a short distance of its end 24ᴬ, I mount and secure by a key 36ᴬ, and keyways 37, a disc 38, that is provided on its side 39, with a circumferentially arranged and equidistantly spaced row of projecting pins 40ᴬ, and a strip of wood 7ᴬ, which is removably secured to the bottom of the cabinet, and one end 41ᴬ of a spring, preferably a coiled spring 42, of about three coils, is secured to the bottom of the cabinet, and the other end 43 is arranged to project upward into the rotative path of the pins 40ᴬ, so that each pin strikes the upper end 43, of the spring 42, and exerts a slight resiliently yielding stopping or brake action on the rotating movement of the disc, and the pins are positioned in the side of the disc in such a relation to the spring 43, that when a pin strikes the top of the spring, a numeral on each of the two discs will be visible in the upper part of the aperture 9ᴬ, in the end 9, of the cabinet.

The shaft 24, may be made of wood or metal, and the discs are preferably made of wood, but they may be made of a light weight metal if desired.

The shaft is rotated in its bearings and thus rotates the discs by means of a crank 44, the connecting end of which is inserted loosely through an aperture 45 formed through the end 11, of the cabinet and it connects to the end of the shaft 24.

Our invention contemplates any kind or character of removable crank connection between the end of the crank and the end of the shaft. We preferably however, provide the crank with a threaded end 46, and with a collar at the inner end of the threaded end portion and the end of the shaft is provided with a threaded hole 47, in extending into its axial center, and the threaded end of the crank is screwed into the threaded aperture in the end of the shaft up tight against its collar, and in order to remove the shaft and its rollers from the cabinet it is necessary to unscrew and remove the crank from the cabinet.

In addition to the two discs provided with the numerals arranged to rotate in front of the aperture 9$^A$, in the side 9, of the cabinet, we place an endless traveling ribbon 36$^B$, which is arranged to travel at right angles to the rotary movement of the discs, and which is provided with numerals, and also with fractions such as one quarter, one half, and one third as shown in Fig. 15, but we do not use this 0 or zero, on this endless ribbon.

Our invention contemplates any means of imparting a traveling movement to the endless ribbon 36$^B$ but the same is preferably mounted upon a pair of vertical rollers 50 and 51 located at opposite ends of the cabinet and close to the side 9. These rollers are provided with axial pivot pins 48 and 49 respectively, which are mounted in the bottom and top of the cabinet, and the rollers are connected at their lower ends by an endless driving belt B, which turns the rollers in unison and thus prevents any pull on the endless ribbon 36$^B$.

We also place two idler rollers in positions on each side of the discs 25 and 25$^A$ to hold the inner side of this endless ribbon away from the peripheral surface of the discs. These idler rollers comprise two rollers 52, which are mounted on axial pins 53, which are inserted in the bottom of the cabinet. Flanges 55, are formed on the top and the lower ends of these idler rollers to hold the endless ribbon on them and from working either above or below them and the rollers are made a trifle wider than the width of the endless traveling ribbon, and its flanges guide and hold the endless ribbon so that it will move in a horizontal plane and run in that plane on its supporting rollers 50 and 51. The axial pin 49, of the roller 51, extends up through the fixed strip of wood 7, on the top of the cabinet and far enough beyond it to allow a crank 56, to be secured to it.

A recess 5$^A$ is formed in the hinged edge of the lid at the end next the crank handle 56, and this recess permits the lid to swing back over the said crank handle as will be understood. When the lid is down, the recess 5$^A$ is closed by a correspondingly shaped strip of wood 5$^B$ which is secured to the adjacent end of the cabinet and to the strip 7.

This endless traveling ribbon is moved by the teacher to bring any number or such a fractional part of a numeral as is required to present the example to the student, by turning the crank 56, and all of numerals on this endless ribbon are thus moved into view in the lower portion of the aperture 9$^A$; thus, if the numeral 6 is exhibited in the lower part of the aperture, and 9, in the upper aperture and the plus sign is in its slide and the swinging slide is down over the disc 25$^A$, the pupil, seeing the three references knows that 5 and 9 are to be added together mentally and that the answer is to be given orally instantly; if the minus sign or reference is placed in the slide, the student knows that 5 is to be substracted from 9 mentally, and the answer 4 is to be given orally. If, then, the endless ribbon is moved to exhibit the one-half sign, then the student knows that he is to subtract one-half of one from nine.

Our invention also contemplates the different phonic combinations, as single letters with prefixes and suffixes, used interchangeably and our invention also contemplates the displaying of short sentences that are within the grasp of the class using the cabinet.

In order to carry out this feature of my invention, we remove the two discs 25 and 25$^A$, and their shaft 24, from the cabinet, and in their place we put one long cylinder or roller 57, around the surface of which we removably secure a sheet 61 of paper or fabric, the ends of which are looped or folded, as shown at 61$^A$, Figure 14.

In the looped ends are slipped thin metal bars 61$^B$, which are hinged together at one end by a link 61$^C$. The opposite ends of the bar 61$^B$ are held behind pins 61$^D$, which are driven into the end portions of the cylinder, as clearly shown in Figure 6. By this means, the strip 61 is firmly but removably secured to the cylinder 57 so as to be removed when desired. The sheet of fabric 61, has printed thereon a circular row of prefixes, and also a circular row of suffixes, the prefixes being separated from the suffixes by a space.

By supplying different prefixes, from those shown in Fig. 6, a proper word can be formed from a group of letters having no meaning, or one word can be changed into a different word. For example: the word "fust" can be changed into must and the word "wap" can be changed into map or sap or lap.

The additional prefixes and suffixes are printed on card board strips 61$^E$ as shown in Figures 10 and 11, and by adding these strips, many combinations can be formed.

For example, the suffix en would be placed in a slideway opposite the cylinder, and would read in connection with the prefixes t, m, h, and so on to make the words ten, men and hen, the prefixes being on the rotating cylinder.

The card board strips having prefixes thereon, would shut out the prefixes on the cylinder, and the strips, having suffixes thereon, would shut out the suffixes in the cylinder.

The slips of cardboard are made to be inserted in a slideway 62, that is formed by a strip of brass 63, that is secured in a recess that is formed entirely across the side 10 of the cabinet 1, and that has its opposite edges 65 and 66 bent over towards its outside and towards each other far enough to form slideway spaces between them, in which the cardboard strips fit loosely and slidably.

A long aperture 67, is cut through this brass strip and also through the side 10, of the cabinet, but the slideway edges of the strip are extended across the whole length of the strip and consequently along the upper and the lower edges of the aperture through the strip 63 and the side 10, of the cabinet.

In Figure 13 we illustrate a sheet of fabric 68, that contains short combinations of words that form sentences, each of which indicates to the mind of the student that thought and action of some kind is implied by each sentence. For instance, the words, "shut your eyes", indicates mental action, and students learn to apply the mental meaning of the sentences.

Our invention contemplates as many of these printed sheets of fabric as a teacher may desire to use with different sentences printed on them, and also, our invention contemplates the making up of sheets of fabric and the printing on them by teachers, of sentences they originate themselves, and also of such words and letters on strips of cardboard as they desire for their own use with their classes in phonics.

The cylinder 57, is secured on a shaft 69, by any suitable means, but preferably by means of a key 70, and keyways 71, and the opposite ends of this shaft fit rotatably in semi-circular shaped bearings 72, that are formed in the same pieces of wood 36, as the bearings of the shaft 24, of the discs 25 and 25ᴬ, but the open journal bearings of the shaft 69, are placed to one side of these for the shaft 24, of the discs, and they are positioned to bring the periphery of the cylinder close to the long open aperture 67, in the side 10, of the cabinet.

The opposite end of the cylinder from that of the discs is provided with a circumferential row of pins 73, and they are arranged to each strike against a coiled spring 74, that is of the same construction as the coiled spring against which the pins of the discs strike, and which is secured to a similar strip of wood 7ᴬ, as the spring 42, and it has an upwardly projecting end 75, that is engaged by the pins 73.

The terminal end 76 of the shaft 69, is provided with a threaded aperture 77, which extends into it a short distance, and an aperture 78, is formed through the end 41, of the cabinet, large enough to receive loosely the hub end of the same crank lever 44, as is used to connect with the end of the shaft of the discs 25 and 25ᴬ.

The pins on the side of the cylinder 57, are positioned to strike against their rotative movement retarding and stopping movement when the letters or the words printed on the white fabric are turned by the teacher to register opposite to the long aperture in the side 10, of the cabinet, so that the cylinder will stop there when turned slowly to bring a letter, or a word, or a sentence, to register in this aperture.

We preferably cover this aperture 67, with a long strip of material 81, which is pivotally secured to the cross bar 82, of a yoke shaped piece of wire 83, that extends around the opposite sides of the cabinet and its ends 84, are bent to extend into holes 85, formed in the opposite sides of the cabinet, and this cover is so hung on the wire that when it is turned up into the position shown in Figure 4, it will remain up, and leave the aperture open.

The operation of the rotating of the discs, and the cylinder, and of bringing the letters, words, and sentences into the apertures through which they will be visible to the students, as well as the numerals and signs that display the mathematical examples, has been clearly explained, and the objects sought to be attained has also been clearly stated, and while we have illustrated the preferred construction and arrangement of our invention, we do not wish to be limited to the construction and arrangement shown, as changes may be made in it without departing from the spirit of our invention.

Having described our invention what we claim as new and desire to secure by Letters Patent is:

1. In an educational device; the combination of a cabinet; provided with a pair of discs one of which is adjustable with respect to the other, each of which is provided with educational indicia on its periphery; means including a crank for rotating said discs together; means for locking the adjustable disk in any position with respect to the other disk, to provide different combinations of numerals; an endless ribbon arranged to be moved at right angles to the rotary movement of said discs, provided with educational indicia; a right angled aperture in one side of said cabinet through which said indicia may be exhibited; a slideway arranged to hold additional indicia to be used in connection with that seen through said aperture; a cover for said cabinet; means for operatively supporting said rotating discs, means for moving said endless ribbon; and a swinging slide arranged to cover or uncover that part of said aperture registering with the adjustable disc.

2. In an educational appliance, a boxlike housing having a sight opening; a rotatable cylindrical element in said housing having a removable surrounding strip provided with an endless series of characters or combinations of characters thereon which successively register with said sight opening as said element is rotated; and an endless succession of characters which are adapted to be moved at right angles to the path of said rotatable element, to register with said sight opening in conjunction with any character or combination of characters on said rotatable element, and means for momentarily retarding the movement of the rotatable element, as its characters register with the sight opening.

3. In an educational appliance, a housing having a sight opening, a rotatable cylindrical element in said housing having a removable surrounding strip provided with an endless series of characters or combinations of characters thereon which successively register with said sight opening as said element is rotated, rollers at opposite ends of said housing, a driving belt connecting said rollers and means for rotating one of said rollers, an endless strip connecting said rollers adapted to move at right angles to the path of said rotatable element and having an endless succession of characters thereon which register with said sight opening in conjunction with a character or combination of characters on said rotatable element, a circular series of pins on one end of said rotatable element and a stationary spring for successively engaging said pins to momentarily retard the movement of the rotatable element as its characters register with the sight opening.

4. In an educational appliance, a housing, a shaft rotatably mounted therein and a sight opening, a cylindrical element rigidly mounted on said shaft, a cylindrical element loosely mounted on said shaft and resilient means for holding it in frictional engagement with the other cylindrical element, each of said elements having an endless series of characters on its periphery which are adapted to register with said sight opening when the elements are rotated, an endless series of characters which are adapted to be moved over said sight opening at right angles to the path of said rotatable elements, a circular series of pins rotatable with said shaft and means for successively engaging said pins to momentarily retard the movement of the rotatable elements as their characters register with said sight opening.

5. In an educational appliance, the combination with a cabinet having a sight opening, a shaft mounted in said cabinet and means for turning the same; of a cylindrical element rigidly mounted on said shaft in line with said sight opening and having indicia on its periphery, a similar cylindrical element loosely mounted on said shaft in line with said sight opening and having indicia on its periphery, an abutment on said shaft, a coil surrounding said shaft and held under compression between said abutment and said loosely mounted cylindrical element to hold the latter in frictional engagement with the rigidly mounted cylindrical element; an endless strip and means for supporting and moving the same on a plane at right angles to the movement of the cylindrical elements; and across said sight opening, and a swinging cover for that part of the sight opening in line with the loosely mounted cylindrical element.

In testimony whereof we affix our signatures.

STEWART K. DAVIS.
ANNA B. DAVIS.